March 8, 1966    H. E. SPENCER ETAL    3,238,846
CORE MILL

Filed Dec. 15, 1964      3 Sheets-Sheet 1

HOMER E. SPENCER
HAMPTON R. COOK
*INVENTOR.*

BY *Charles E. Woodward*
ATTORNEY

March 8, 1966  H. E. SPENCER ETAL  3,238,846
CORE MILL

Filed Dec. 15, 1964  3 Sheets-Sheet 2

HOMER E. SPENCER
HAMPTON R. COOK
*INVENTOR.*

BY *Charles C. Woodward*
ATTORNEY

HOMER E. SPENCER
HAMPTON R. COOK
*INVENTOR.*

United States Patent Office 3,238,846
Patented Mar. 8, 1966

3,238,846
CORE MILL
Homer E. Spencer and Hampton R. Cook, Fort Worth, Tex., assignors to General Dynamics Corporation, Fort Worth, Tex., a corporation of Delaware
Filed Dec. 15, 1964, Ser. No. 418,465
6 Claims. (Cl. 90—13)

The present invention relates generally to milling devices.

More particularly, the present invention relates to slab type mills and is operable to maintain a substantially tangential cutting relationship between the cutting edges of a plurality of rotating disc cutters mounted in a rotating cylindrical arbor and a very low density, discerptible or recticular workpiece. The cutters in the preferred embodiment are driven by pneumatic turbines mounted in an arbor in a double helix relationship such that continuous incremental cutting can be accomplished.

Further, the present invention is capable of shaping these low density materials into substantially any geometry in one operation in that the independent suspension system of the arbor allows the arbor to pivot about an infinite number of lateral axes which perpendicularly intersect the longitudinal axis as defined by, and about which, the arbor rotates. This capability is further augmented by the ability of a slidable platen, to which the workpiece is affixed, to alter the angular relationship between the platen and the arbor, thus permitting percent line cuts.

To the present time, several methods, with their associated apparatus, have been evolved to shape honeycomb core. One of these methods utilizes band saws, while more advanced common state-of-the-art methods employ transversing single cutter duplicating mills, and other similiar single element devices generally referred to as "baloney slicers."

Many deleterious characteristics are inherent in these present methods and their apparatus which are detrimental to the fabrication and shaping of low density materials. These are of prime concern in the aerospace industry since many bonded, low density structural panels are being employed in modern aircraft and missiles. These panels are generally constructed of honeycomb-type low density core having skins fixed upon the opposing outer surfaces thereof. These panels must possess considerable structural integrity. A significant consideration in achieving this integrity resides in the bond strength achievable between the skins and the interposed core. Bond strengths obviously are detrimentally affected by irregularities in the surface to be bonded, primarily due to voids created by such irregular surfaces which interrupt bonding. Further, the core material should perpendicularly intersect the sandwiching skins to augment effective filleting which is necessary for high quality bonding.

Many characteristics are inherent in present methods and apparatus which prevent the production of a smooth surface free of bent or torn edges. For example, in the band saw method, particular difficulty is encountered in maintaining the proper tangential relationship between a contour line and the saw blade. Obviously, this problem is magnified if percent line contours are attempted since substantial directional control must be maintained in two planes in order to prevent saw marks. These marks are an intrinsic problem and are generally produced by a "heeling" effect. This specific effect is resultant from a trowelling of the finish surface by the trailing edge of the saw blade during the altering of the angular relationship between such saw blade and the workpiece. Further, as these configurations are substantially hand made, the aggregate cost of a single part may be prohibitive and materially limits the achievement of effective quality control.

The method of cutting low density material employing a transversing single cutter duplicating mill requires numerous progressive longitudinal cuts in order to shape a given piece of material. As in the previously discussed method, great care must be taken to prevent the formation of ridges by the angular relationship between individual cutting paths. Obviously, such prevention is extremely difficult since, in all known methods, a flat blade-like surface having a suitable cutting edge is utilized to shape core. These instruments require repetitive cuts, which if not suitably closely controlled, form flat tangential surfaces about any radius in the configuration to be cut, and on reverse contours results in a "heeling" effect on the finished surface, above described.

Therefore, this type apparatus is substantially limited to cutting flat surfaces or very shallow contours. Additional limitations are imposed thereon by the depth of the cuts which can be accomplished with each stroke of the single cutter. Therefore, on certain sections, redundant cuts are necessary in order to merely attain contour line since the removed stock tends to wrap around the cutter and quill. These shallow cuts must be repeated in a progressive manner, thus significantly multiplying the time and effort required to shape a part.

The present invention obviates these difficulties and other objections of the prior art by employment of high speed saws affixed to the output shafts of a multiplicity of pneumatic turbines, which are mounted within a rotatable cylindrical arbor having plural directional movement capability.

The positioning of the turbines within the arbor takes a double helix configuration, which configuration presents an overlapping cutting pattern to the workpiece upon rotation of the arbor. Further, the turbines are offset toward the direction of arbor rotation, in the preferred embodiment .03 inch. This offset is relative to a given radius line which line extends from the center of the arbor through a point (in the present embodiment .03 inch) behind the center line of each individual turbine to prevent "heeling" or trowelling of the workpiece. The turbines, of which there are 201 employed in the preferred embodiment, are of the vane type and rotate at about 18,000 revolutions per minute on 80 to 100 pounds of air pressure. In the preferred embodiment and present use, the arbor rotates at thirty revolutions per minute and is driven and controlled by a hydraulic, orbital type, slow speed, high torque motor affixed to one extremity of the arbor.

Due to the unique disposition of the cutters within the rotating arbor of the present invention, the entire arbor and all cutters function as one composite cutter, thereby permitting a substantially tangential relationship to be maintained between the surface being cut and the outer radius or circumference described by the circular saws during their orbit. Each saw, with its associated turbine, cuts incrementally and thus limits the shavings to small thin pieces which do not foul the spindles.

The radius which can be cut is limited only by the orbit radius described by the rotating turbines and cutters. Vertical and horizontal percent line cuts may be accomplished simultaneously while cutting a specific contour by raising or lowering either end of the arbor axis relative to the platen for the vertical percent line and by yawing the platen relative to the arbor axis for the lateral percent line cuts.

The workpiece to be shaped is affixed to a movable platen whose predetermined movements relative to the rotating arbor are controlled by a tooling cam mounted within the bed of the base. This tooling cam controls the lateral yaw or angular relationship of the workpiece relative to the center of rotation of the arbor and thus effects lateral percent line cuts. The vertical percent line of the workpiece is, in the preferred embodiment, produced by two additional tooling cams which may be located at each extremity of the arbor. These cams are operable to alter the vertical distance between the arbor and the platen. This distance may also vary at the ends of the arbor since each end is capable of acting individually according to individual requirements as dictated by the tooling cams. The platen is driven by a hydraulic cylinder at a given speed thus automatically fully shaping the workpiece in only one operation. The device of the invention, once set up, is capable of mass producing low density parts of extremely complicated contours at a high production rate.

It is therefore the salient object of the present invention to provide a semi-automated method and device to produce shaped, low density parts having contours or percent line contours therein and which parts have surface finishes free of irregularities.

Other factors and many attendant advantages will become apparent to those skilled in the art when taken in conjunction with the following detailed description and drawings, in which.

Figure 1:
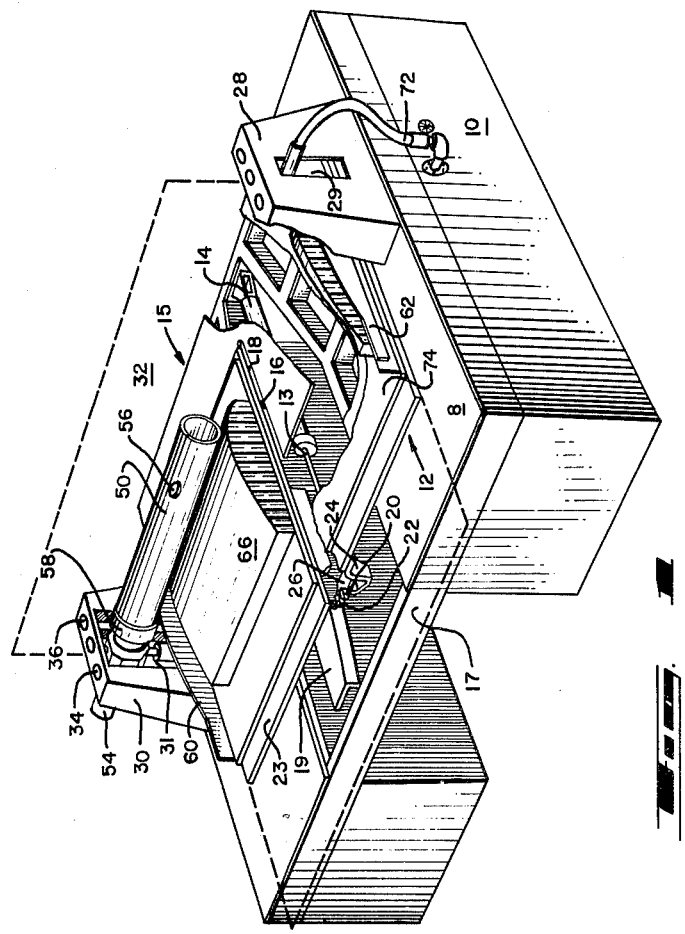
FIGURE 1 is an isometric, pictorial, cut-away view of the present invention.

A preferred embodiment of the present invention as shown in FIGURE 1 is comprised, in combination, of a machine base 10 having a bed portion 8 which slideably supports a hydraulically actuated platen 12. Platen 12 is pivotally attached to ram 13 of hydraulic cylinder 14, which is pivotally affixed to side 15 of machine base 10. This construction allows hydraulic cylinder 14 to slide platen 12, depending on the stroke of ram 13, either forward or backward within a horizontal plane 17 adjacent to the upper surface of machine base 10. Platen 12 has affixed to one edge, corresponding to side 15 of bed 8, a cam follower 16 entrapped within elongated slot 18.

This cam follower 16-slot 18 relationship insures that one point of platen 12 is properly located relative to the hereinafter described support guide yokes and arbor and further provides platen 12 a moveable point about which it may pivot to effect percent line cuts. This pivoting motion is created and controlled by an auxiliary tooling cam 19 which is affixed to machine bed 8 at the extremity opposite hydraulic cylinder 14. The proper location of tooling cam 19 may best be assured by utilization of master tooling holes, not shown. Tooling cam 19 cooperates with cam followers 20 and 22, one of which is rotatably mounted upon bracket 24 affixed to platen 12. The rotatable cam follower 20 tracks the motion controlling side of cam 19, thus programming the lateral motion of trailing portion 23 of platen 12 during movement of platen 12 across machine base 10.

The remaining cam follower 22 rides the reverse side of cam track 19 and is interconnected to cam follower 20 by a swivelling link 26. This insures positive tracking of follower 20 along cam 19.

Machine base 10 has vertically affixed thereto upon opposing sides supporting guide yokes 28 and 30, which have rectangular openings 29 and 31 respectively. Guide yokes 28 and 30 are centered on vertical plane 32 which is perpendicular to the travel of platen 12. As both vertical supporting guide yokes are substantially identical, except as specifically noted, only one will be described in detail.

Figure 2:
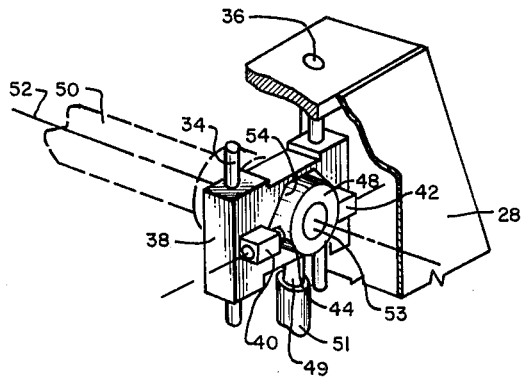
FIGURE 2 is an isometric, partially sectional view of a typical support guide yoke and one end of the arbor, of the present invention, having cut away sections therein revealing the independent suspension system.
Figure 5:
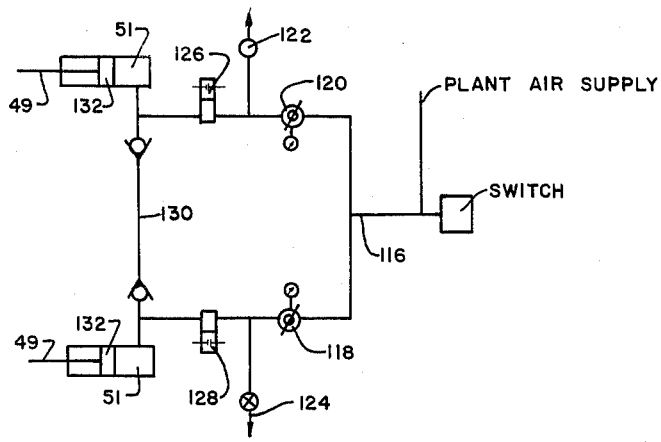
FIGURE 5 is a schematic illustration of the pneumatic system which provides an air cushion for the arbor.

Referring now to FIGURE 2, the arbor suspension system located within the guide yoke 28 comprises two guide rods 34 and 36 mounted vertically in a spaced relationship one to the other for slideably receiving a support block 38. Support block 38 has apertures therein for receiving the guide rods and utilizes lineal ball bushings, not shown, to reduce friction between guide rods 34–36 and the periphery of the apertures. Support block 33 has two trunnions, 40 and 42, attached to its outermost surface. Trunnions 40 and 42 rotatably receive cylindrical shafts 44 (only one of which is shown) which are integral appendages of, and located diametrically opposite the sides of, support bearing 48. Support bearing 48 has pivotally attached to its lower portion a ram 49 of pneumatic cylinder 51, which latter is anchored to machine base 10. This cylinder 51 functions as a shock absorber. Support bearing 48 rotatably receives journal 53 of cylindrical arbor 50. Arbor 50 extends across platen 12 to guide yoke 30 upon the opposing side of machine base 10 and is caused to rotate about axial centerline 52 by hydraulic motor 54. Arbor 50 may be constructed of seamless steel and functions as a supporting means for pneumatic turbines 55. The embodiment now in use employs 201 pneumatic turbines, but this is obviously subject to choice. Turbines 55 are located in apertures in arbor 50 which spiral down the length of arbor 50 in a double helix configuration as hereinabove described. Turbines 55 each have attached to the output shaft a circular stainless steel jeweler's saw 56, see FIGURE 5. Arbor 50 has two identical circular cam followers 58 (only one of which is shown) located at opposite extremities thereof. These cam followers 58 are capable of rotating independently of arbor 50 thus allowing a differential in cam follower rotational speed. Cam followers 58 cooperate with two auxiliary tooling cams 60 and 62 located one upon either side of workpiece 66 which is to be machined. Workpiece 66 is positioned upon mill fixture 74 which is subsequently located upon platen 12 by master tooling dowels (not shown). Auxiliary tooling cams 60 and 62 are located by additional tooling dowel receptacles (not shown) in mill fixture 74.

Tooling cams 60 and 62 control the vertical movement of arbor 50 relative to platen 12. In this manner not only the vertical distance between the arbor and platen may be varied, but the platen and attached workpiece 66 may be caused (by tooling cam 19) to pass under stationary arbor 50 in an infinate number of continuously altering skews. As each end of the arbor, regulated by tooling cams 60 and 62, is capable of acting independently, the vertical distance between the arbor and platen may be unequal at any given time to thus allow a number of unusual geometric shapes, such as present line contours, to be machined with the present invention.

Figure 3:
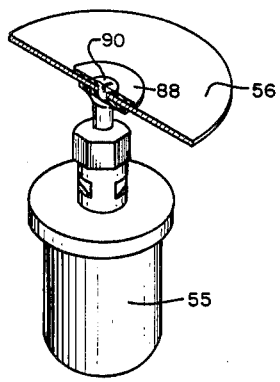
FIGURE 3 is a pictorial view, partially in section, of a typical pneumatic turbine and associated cutter.

Arbor 50 is caused to rotate by an orbital type hydraulic motor 54 suitably attached and positioned at one extremity of arbor 50. As hereinabove stated, arbor 50 retains and supports a multiplicity of pneumatic type turbines 55. These turbines, see FIGURE 1, are supplied air (preferably at from 80 to 100 pounds per square inch) through a high pressure air line 72 which enters the arbor at the extremity opposite hydraulic motor 54. In this embodiment, arbor 50 is preferably manufactured from a ten inch diameter seamless steel tube, thereby permitting its employment as a manifold for pneumatic motors 55. Each motor 55 (FIGURE 3) has affixed to its output shaft a 1½" diameter jeweler's saw 56 of high speed steel retained by a circular retainer disk 88 and self locking screw 90.

In operation, workpiece 66, generally of low density material, is affixed within a suitable mill fixture 74 which is attached to machine base 10 as disclosed supra. As shown, hydraulic cylinder 14 propels platen 12 under arbor 50. Feed rate and travel of platen 12 is controlled by the exhaust rate of cylinder 14.

Figure 4:
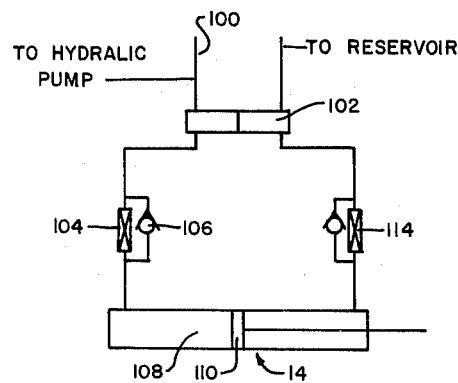
FIGURE 4 is a schematic illustration of the hydraulic system of the present invention which drives the platen.

Referring now to the schematic showing of FIGURE 4, hydraulic fluid under constant pressure is fed by hydraulic pump 100 into four-way Waterman type valve 102, from which it travels to either metering valve 104 or check valve 106 depending on whether the ram 13 is being withdrawn or extended. In extending the ram, fluid passes through open check valve 106 into chamber 108 of cylinder 14. This creates pressure upon one side of piston 110. The remaining chamber 112 is full of residual fluid from the withdrawal stroke, therefore, as piston 110 moves toward chamber 112 the residual fluid is placed in compression. Controlled movement of piston 110 (hence ram 13) is accomplished by metering the exhausting of the residual fluid in chamber 112, thus allowing chamber 108 to fill and expand. Metering of the exhausted fluid is accomplished by metering valve 114 after the fluid is returned to the reservoir. Movement of ram 13 is accomplished by reversal of the valving.

A system (FIGURE 5) similar to the hydraulic system is employed in providing a shock absorber for arbor 50. Further this system prevents tooling cams 60 and 62 from supporting the entire weight of arbor 50 and allows better response to geometric changes in cam configuration, i.e., it functions as a counterweight.

This system is pneumatic and is comprised of a source of air pressure of approximately 80 p.s.i. The air travels to bifurcated section 116 and through regulators 118 and 120. It then passes bleed valves 122 and 124 to two solenoid controlled valves 126 and 128. The air now enters valved line 130 between the cylinders, one of which is numerically designed 51 (see also FIGURE 2). Air under pressure now enters cylinders 51 at each guide yoke.

Proper pressure is maintained by bleeding air through bleed valves 122 and 124, thus permitting only the proper air pressure to be exerted against pistons 132, hence rams 49.

Workpiece 66 may be held in place on fixture 74 by a polyglycol solution which prevents its movement as workpiece 66 is propelled into contact with rotating arbor 50 and its associated pneumatic motors 55 and saw blades 56.

In a typical cutting operation, the workpiece 66 is attached to mill fixture 74 by polyglycol adhesive to "chuck" the workpiece within mill fixture 74. Fixture 74 has, as mentioned, tooling cams 60 and 62 affixed one at each extremity thereof. These tooling cams are associated with mill fixture 74 rather than the machine base for they obviously vary with each configuration to be cut. Mill fixture 74 is then centrally located upon slideable platen 12 by two master tooling holes, not shown. These master tooling holes insure the proper location of the workpiece and tooling cams relative to arbor 50 and tooling cam 16.

After positioning, fixture 74 is bolted to platen 12. The slideable platen is then moved to the extremity of its travel furthest removed from cam followers 20 and 22 to facilitate the installation of tooling cam 16 under machine base 10. Tooling cam 16 is bolted between cam followers 20 and 22 as dictated by two master tooling holes (not shown) in machine base 10. The mill is then ready to begin a cutting operation. The sequence for this operation is begun by moving platen 12, fixture 74 and workpiece 66 under arbor 50 to a position which will allow cam followers 58 to contact the starting end (the more gradual incline) of tooling cams 60 and 62 when arbor 50 is lowered, however, arbor 50 and its associated cutters 70 are not allowed to contact workpiece 66 at this time.

Next arbor 50 is caused to rotate by feeding hydraulic fluid through a suitable solenoid operated metering valve to a hydraulic motor at a predetermined rate. The pneumatic turbines 55 are then activated by allowing air to enter arbor 50 through a suitable solenoid operated metering valve. Arbor 50 functions as a manifold for the numerous turbines mounted therein which insures that all turbines are fed sufficient air to achieve from 16,000 to 18,000 rotations per minute at 100 pounds per square inch of intake air.

With the platen 12 in position and both the turbines 55 and arbor 50 operating, the slideable platen is driven forward, causing workpiece 66 to tangentially contact the orbiting turbines 55 and their associated saw blades 56. This movement of platen 12 is caused and regulated by a series of solenoid operated valves. Valve 102 allows hydraulic fluid under constant pressure to enter the intake side 108 of hydraulic cylinder 14. Movement and rate of movement of platen 12 is controlled by a metering valve 114 at the exhaust end 112 of cylinder 14. Reverse movement of platen 12 is accomplished by pumping pressured hydraulic fluid into the exhaust end 112 of cylinder 14 and regulating the intake valve for the proper bleed. As fluid is bled from cylinder 14 of platen 12, fixture 74 and tooling cams 60 and 62 are driven forward and thus into contact with rotating arbor 50. Cam followers 58, rotating independently of arbor 50, are caused to respond to the geometry dictated by programming cams 60 and 62 carrying arbor 50, thus raising and lowering arbor 50 to form the specific contour desired. Percent line cuts are formed as platen 12, guided by cam followers 20 and 22, is driven forward along auxiliary tooling cam 19. Platen 12 has, at the extremity opposite cam followers 20 and 22, a single roller (not shown) entrapped within a suitable slot located in the center of the machine base. This roller and slot provide a point about which the platen is caused to pivot by cam 19. Through this action, the trailing portion 23 of the platen 12 is allowed to swing relative to the leading portion as dictated by auxiliary tooling cam 19 and cam followers 20 and 22.

This combination of possible movements results in the workpiece being shaped to substantially any geometry, simple or complex, in one operation while maintaining only tangential contact between the rotating cutters and the workpiece.

Therefore what is desired to secure by Letters Patent is:

1. A device for milling low density core material having compound curvatures for airfoils in a single, continuous operational pass, comprising in combination:
   (A) a base portion,
   (B) means for supporting a workpiece, said means movable selectively longitudinally and partially rotationally in a plane established by said base portion;
   (C) means supported on said base operative to support and vertically selectively guide the extremities of a workpiece milling means;
   (D) milling means support means rotatable about a line extending through its long axis, said means movable vertically uniformly and differentially from each extremity;
   (E) plural saw means supported by said milling support means operative to incrementally, tangentially contact and shape a supported workpiece to thus make an infinite number of tangential cuts.

2. A milling device for shaping airfoils having complex configurations in a single operation, comprising:
   (A) a base support portion, said portion having attached thereto means operative to effect longitudinal travel of a workpiece forwardly or backwardly,
      (1) means attached to said base portion operative to effect transverse rotational motion of one portion of the workpiece about a given point on said base portion;
   (B) means supporting a workpiece supported by and slideably movable on said base portion, said means operatively attached to said longitudinal travel effecting means of said base portion,
      (1) said workpiece supporting means also operatively associated with said transverse, rotational motion effecting means of said base portion operative to cause said workpiece support means to yaw in a predetermined direction to achieve percent line cuts,
(2) said workpiece supporting means having primary airfoil surface forming cam means thereon;
(C) guide means cooperative with said base portion operative to support and vertically guide the cooperative extremities of a workpiece milling means,
(D) milling means support means guideably supported on each end for selected differential movement in said guide means, said milling means support means comprising
(1) a cylindrical arbor rotatable about a line coinciding with its longitudinal axis at a constant predetermined speed,
(2) cam follower means operatively associated with each end of said milling means support means and rotatable independently thereof, said means responsive to said surface forming cam means;
(E) plural cutter means radially supported by said rotatable arbor with respect to the arbor axis, each said cutter means rotatable at a 90° angle to the arbor radius on which it lies and operative to incrementally, tangentially contact and shape a workpiece to thus make a substantially infinite number of tangential cuts.

3. Apparatus for shaping complex configurations comprising in combination:
(A) a base portion, said base portion comprising:
(1) first means operative to affect longitudinal travel of a workpiece,
(2) second means operative to affect concurrent limited transverse rotational motion of the workpiece about a given point on said base portion;
(B) a platen slideably movably supported on said base portion operatively associated with said first and second means;
said platen having attached thereto workpiece shaping programming means;
(C) rotatable cylindrical cutter support means movably differentially responsive to said programming means and said base portion second named means;
(D) plural independent cutter means radially supported on said cutter support means in a configuration operative to intermittently and tangentially contact the workpiece during support means rotation to prevent heeling of the workpiece and build-up of cut material.

4. The apparatus as defined in claim 3 wherein said plural independent cutter means are in a spaced apart double helical configuration with respect to the cylindrical surface of said cutter support means.

5. Apparatus for forming low density core material to a desired configuration in a continuous operation comprising, in combination:
(A) a base establishing a horizontal plane comprising:
(1) means operative to impart longitudinal motion to a workpiece in said horizontal plane, said means comprising a fluid actuated cylinder pivotally attached at its one end to an end of said base and at its opposite extremity acting to impart motion to an object workpiece,
(2) means operative to impart concurrent limited transverse motion to the workpiece to cause it to skew within the horizontal plane established by said base to effect horizontal percent line cuts, and
(3) vertical cut programming means;
(B) rotatable cutter support means responsive to said programming means;
(C) plural independent cutter means supported by said cutter support means in a configuration operative to tangentially contact the workpiece during support means rotation.

6. Apparatus as defined in claim 5 wherein said cutter support means is a cylindrical arbor, and said cutter means form a double helix configuration with respect to the cylindrical surface in such a manner as to present an overlapping cutting pattern to the workpiece on arbor rotation, said cutters offset toward the direction of arbor rotation relative to a given radius line extending from the arbor center through a point behind the centerline of said cutter, to constitute said arbor and cutter means a composite cutter incrementally contacting the workpiece at an infinite number of points.

No references cited.

WILLIAM W. DYER, JR., *Primary Examiner.*

G. A. DOST, *Assistant Examiner.*